United States Patent
Magill et al.

(10) Patent No.: US 12,197,913 B1
(45) Date of Patent: Jan. 14, 2025

(54) MACHINE LEARNING METHODS FOR SOURCE CODE QUALITY ANALYSIS

(71) Applicant: MUSE DEV, INC., Portland, OR (US)

(72) Inventors: Stephen Magill, Portland, OR (US); Pavani Guttula, Portland, OR (US); Suresh Jagannathan, Portland, OR (US)

(73) Assignee: SONATYPE, INC., Fulton, MD (US)

( * ) Notice: Subject to any disclaimer, the term of this patent is extended or adjusted under 35 U.S.C. 154(b) by 0 days.

(21) Appl. No.: 17/114,049

(22) Filed: Dec. 7, 2020

(51) Int. Cl.
| | |
|---|---|
| *G06F 8/75* | (2018.01) |
| *G06F 8/36* | (2018.01) |
| *G06F 18/24* | (2023.01) |
| *G06N 20/00* | (2019.01) |

(52) U.S. Cl.
CPC ............. *G06F 8/75* (2013.01); *G06F 8/36* (2013.01); *G06F 18/24* (2023.01); *G06N 20/00* (2019.01)

(58) Field of Classification Search
CPC .. G06F 8/75; G06F 8/65; G06F 18/24; G06N 20/00
See application file for complete search history.

(56) References Cited

U.S. PATENT DOCUMENTS

| | | | |
|---|---|---|---|
| 7,340,726 B1* | 3/2008 | Chelf | G06F 11/3604 714/38.12 |
| 10,740,216 B1* | 8/2020 | Parent | G06N 20/00 |
| 10,860,593 B1* | 12/2020 | Ross | G06Q 30/0201 |
| 2017/0286839 A1 | 10/2017 | Parker | |
| 2019/0235987 A1* | 8/2019 | Bagal | G06F 11/362 |
| 2020/0097387 A1* | 3/2020 | Loyola | G06F 11/366 |
| 2021/0287131 A1* | 9/2021 | Bhide | G06N 5/04 |
| 2022/0083450 A1* | 3/2022 | Geddes | G06F 21/57 |

OTHER PUBLICATIONS

Alon et al., "A General Path-Based Representation for Predicting Program Properties", 2016, arXiv:1611.01752 [cs.PL] (34 pages).
Belik et al., "Learning a Static Analyzer From Data", 2018, arXiv:1803.09544 [cs.PL] (16 pages).
Zilberstein and Yahav, "Leveraging a Corpus of Natural Language Descriptions for Program Similarity", Onward! 2016: Proceedings of the 2016 ACM International Symposium on New Ideas, New Paradigms, and Reflections on Programming and Software Oct. 2016 pp. 197-211 (15 pages).

* cited by examiner

*Primary Examiner* — Ziaul A Chowdhury
(74) *Attorney, Agent, or Firm* — FisherBroyles, LLP; Jeremy P. Sanders

(57) ABSTRACT

A preferably cloud-based platform supports improvements in software development by assessing quality of source code files, for example, when files are pushed to a software repository. Various static analysis tools are executed on a source file, and the resulting bug reports, which reflect native features of the tools are assembled in a dataset. The bug dataset is enhanced by adding additional features that are not natively generated by the static analysis tool. An ML classifier is trained to predict a selected bug feature, and the classifier is used to update the bug dataset to include estimated values of the selected feature. In an embodiment, post-processing analysis of bug report datasets applies machine learning methods to predict the "severity" of bug reports, an indication of whether they are likely to be true or false. Further, a report of code quality can be returned based on the severity predictions.

27 Claims, 5 Drawing Sheets

MACHINE LEARNING METHODS FOR SOURCE CODE QUALITY ANALYSIS

RELATED APPLICATIONS

None; this is an original application.

COPYRIGHT NOTICE

© 2020 Muse Dev, Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71 (d).

BACKGROUND OF THE INVENTION

Software projects may be hosted on servers or cloud warehouses which act as central repositories during development, especially for open source projects, in part to implement version control. One example of such a repository is GitHub. Analyzing the quality of source code in a software project is a hard problem. Formal verification can ensure high code quality, but hardly any software projects in the real-world are formally verified due to the prohibitively high cost of specification and verification. A practical but more imprecise alternative to formal verification is static analysis. Various static analysis tools may run automatically when a "pull request" is processed to update the code in a repository. One can run static analysis tools, such as FB Infer, ErrorProne, and SonarQube, on software development projects and let the analysis results speak for the quality of the projects analyzed. Static tools may test for security, performance, memory leaks and other issues. Most of them apply a set of rules for those purposes. Others may utilize a large dataset of bugs and fixes to recognize problems. In practice, a Java project for example, on which FB Infer reports many issues, can be considered (to a first approximation) to be of somewhat lesser quality than a project on which the same tool reports fewer issues.

While static analysis does provide a good first approximation of code quality, its efficacy as a metric depends on the extent to which the analysis produces correct results. Known static analysis tools, including the aforementioned ones, are both unsound and imprecise. They are unsound in the sense that they can report false negatives: they may claim a program does not exhibit an undesirable property, when in fact it might. They are imprecise because they can report false positives: they may claim a program exhibits an undesirable feature when in fact it does not. The disclosure that follows solves this and other problems.

SUMMARY OF THE INVENTION

The following is a summary of the invention in order to provide a basic understanding of some aspects of the invention. This summary is not intended to identify key/critical elements of the invention or to delineate the scope of the invention. Its sole purpose is to present some concepts of the invention in a simplified form as a prelude to the more detailed description that is presented later.

Although the need remains for improvement in static code analysis tools themselves, we take a different approach. We seek to improve the usefulness of static tool results by calibrating their accuracy via post-processing of their results, both individually and in combination (ensembles).

The innovation generally must be implemented in software (i.e., stored, machine-readable instructions) for execution in one or more processors. The volume and complexity of operations involved preclude any manual or "pencil and paper" solution as impracticable. In one preferred embodiment, an implementation of the invention may be provided as a service, for example, over a network such as the internet. The implementing software and processor(s) may be provisioned on a cloud server to provide such a service. Customer or client software may be arranged for integration with a source repository to automatically run at each pull request. In one example, an implementation of the invention may comprise a container-based platform on Linux running on Amazon Web Services (AWS). The cloud platform integrates directly with repository hosts like Github and requires no installation of code into the user's environment.

In an example, a method according to this disclosure may comprise the steps of:

accessing a machine-readable bug dataset of bug reports generated by at least one static analysis tool, wherein each bug report includes a set of native features;

selecting a bug feature that is not natively generated by the static analysis tool;

accessing an ML classifier that has been trained to predict the selected bug feature;

executing the ML classifier on the bug dataset to generate an estimated value of the selected feature for at least some of the bugs in the bug dataset; and updating the bug dataset to include the estimated value of the selected feature for the bug reports for which a value was generated by the ML classifier.

In another example, the above method wherein the selected bug feature is a "severity score" that expresses a likelihood that the corresponding bug report is a true positive, and further comprising: assessing a quality of the source code file based on the estimated values of the selected feature over the updated bug dataset; and returning a report of the quality assessment.

We calibrate the extent to which sources of imprecision and unsoundness reduce the rate of true positives and negatives so that we can be reasonably sure that a project with higher number of reported issues is indeed of lower quality.

Additional aspects and advantages of this invention will be apparent from the following detailed description of preferred embodiments, which proceeds with reference to the accompanying drawings.

DETAILED DESCRIPTION OF PREFERRED EMBODIMENTS

Figure 1A:
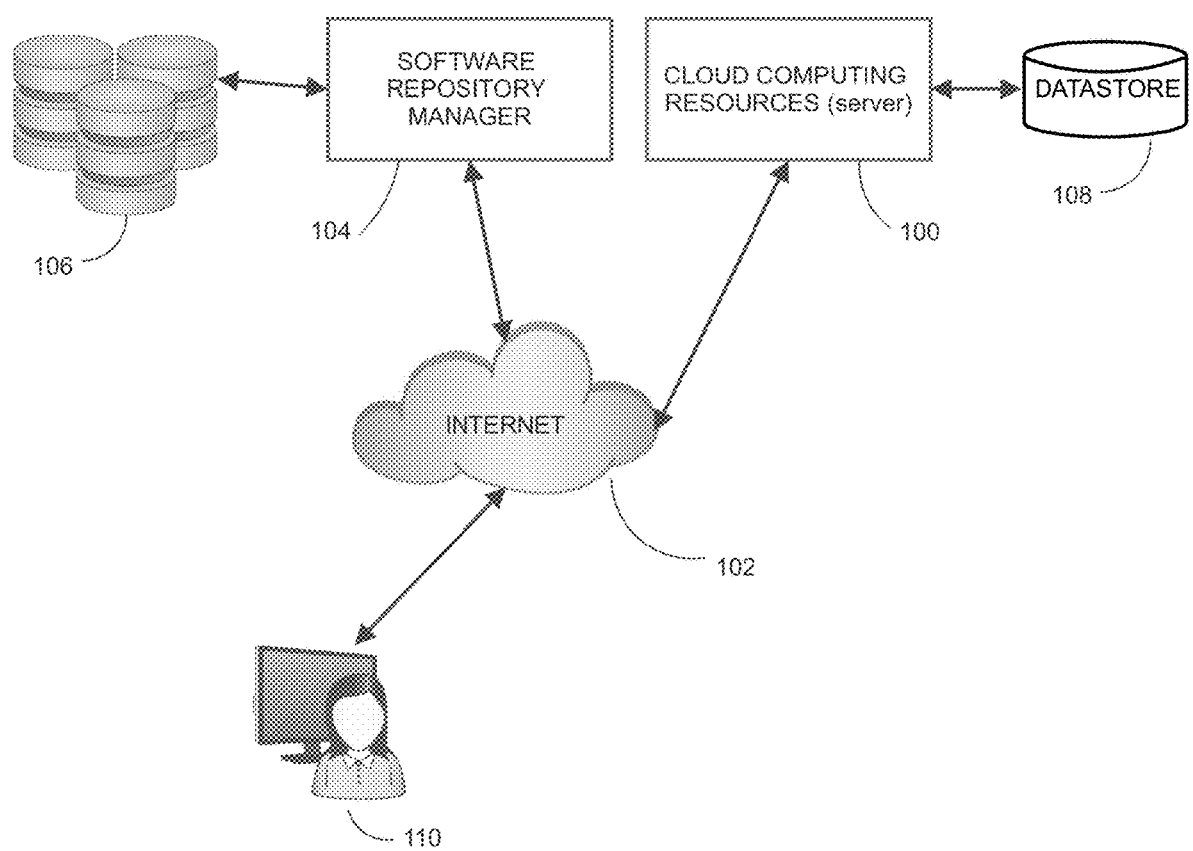
FIG. 1A is a simplified block diagram of an example of a cloud-based system to apply machine learning methods for bug detection and source code quality assessment.

FIG. 1A illustrates a system to apply machine learning methods for bug detection and source code quality analysis. Many different hardware and software architectures may be used; this is merely a simplified illustration of an example of such a system. In FIG. 1A, cloud computing resources 100, such as one or more servers and associated memory, may be provisioned. We refer to the resources as simply a "server 100" hereinafter to not clutter the description. The server 100 is coupled to a network such as the internet 102 for data communications. The server 100 may also be coupled to a datastore 108 to store software and data as further described below. A user machine 110 may utilize services provided by the server 100 via the network 102, for example, in a SaaS model.

A software repository 106 may be managed by a software repository manager system 104 for security, change management, version management and the like, for example, to support software developers who store their projects in the repository 106. GitHub provides such services. For example, a GitHub "Pull request" enables a developer to notify others about changes that have been pushed to a GitHub repository. Once a pull request is sent, interested parties can review the set of changes, discuss potential modifications, and even push follow-up commits if necessary. In one scenario, results of a code quality analysis as described below may be pushed to the corresponding repository in a pull request. In one scenario, a developer or other user at a machine or terminal 110 may request a QA by sending the request to the server 100. In some cases, the server 100 may be arranged to automatically run a QA for a given project in response to a pull request indicating a change in the source code of the project. Although the server 100 is illustrated in a cloud computing environment, the methods described herein also may be implemented locally on a particular server or local network.

Figure 1B:
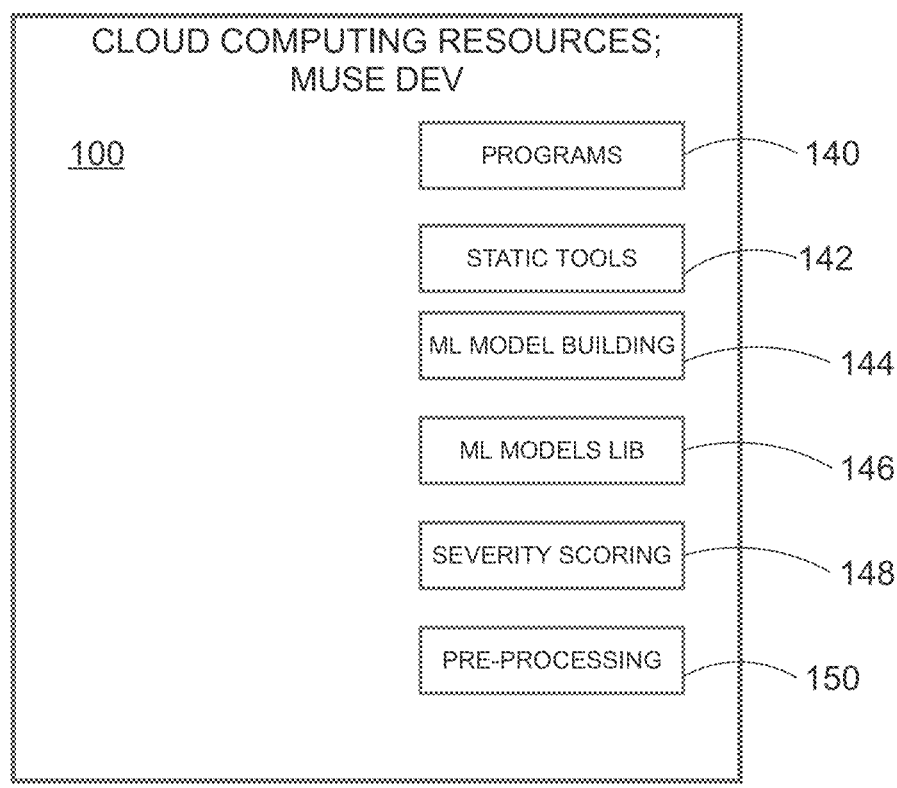
FIG. 1B is a simplified block illustrating some components of the server of FIG. 1A.

FIG. 1B is a simplified block illustrating some components of the server of FIG. 1A. Various static code analysis programs are known and commercially available; two examples are Infer and ErrorProne. These tools and programs like them generate bug reports to describe bugs (or potential bugs) they discover in a source code file. We refer to such programs as static tools, illustrated as component 142 in the server 100 in FIG. 1B. In practice, the static tools may be provisioned elsewhere in the cloud, or in a datastore 108 (FIG. 1A), etc. The static tools, in operation, generate bug reports—each bug report describing a bug discovered in a source code file. A bug report may be stored in any machine-readable form, for example, a database record, JSON or XML file.

One example of a bug report may contain fields or features such as the following:

tnTool—Tool type or name
tnType—Error type
tnDesc—Error Description
tnFile—File path at which tool reports a bug
tnLine—Line number on which tool reports a bug
tnProcedure—Method name in which tool reports a bug
error_num—Index number of the reported bug.

As described previously, static tools are imprecise and can sometimes return false positives. That is, they may report a bug that is not really a bug; that is, the report refers to a code line or structure that actually would not adversely impact operation or results of the subject source code file. False positives tend to limit the static tools' utility and or reliability. Our focus in this section is on applying Machine Learning (ML) techniques to better separate true positives from false positives. Additional components of FIG. 1B are described later. First, a high-level overview of one embodiment of the present disclosure is given in FIG. 4.

Figure 4:
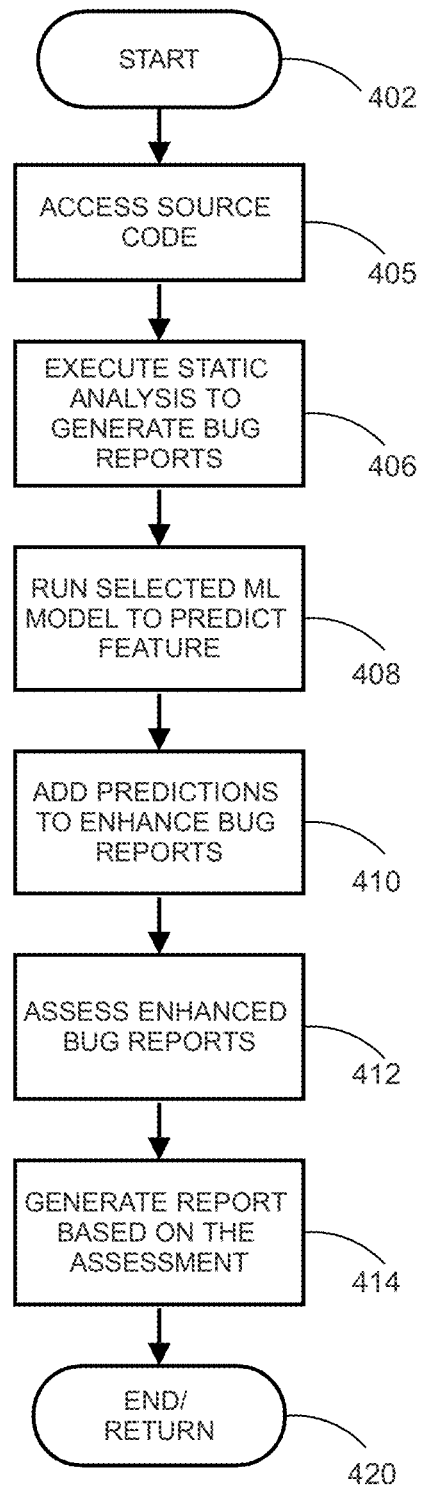
FIG. 4 is a simplified high-level flow diagram of a process for applying machine learning to improve utility of source code bug report datasets.

FIG. 4 is a simplified high-level flow diagram of a process for applying machine learning to improve utility of source code bug report datasets. This process may utilize features other than scoring a likelihood of a false positive-described in detail below. In other cases, another defined feature may be provided; that is, manually assigned to each bug report in a dataset, in order to prepare a training set to generate an ML classifier with the purpose of classifying bugs (reported by static tools) with regard to that defined feature. In one example, the defined feature (manually assigned) may be a metric of importance of the bug.

In FIG. 4, an illustrative process begins at 402. The process accesses a selected source code file, block 405. Then it executes one or preferably more than one static analysis tool to generate bug reports on the selected code file, block 406. The bug reports are stored as a dataset. In the dataset, each bug report (a record, line, etc.) include a series of parameters or features such as those mentioned above that are generated by the static tool(s). Then, an ML algorithm is selected and run on the dataset to predict an additional feature value for each bug, block 408. In a preferred embodiment, that additional feature is a likelihood that the bug report is a false positive. The additional feature value (prediction) is added to enhance the bug report dataset, block 410. The enhanced bug report may be assessed, block 412, and based on that assessment, the system may generate a report on the quality of the source code file, block 414. The report can be delivered to the user in any convenient fashion. Alternatively, or in addition, the report can be incorporated into a pull request on the source code file in the corresponding repository. This process concludes at terminal block 420.

Training the ML Model to Predict Bug Report Features

Figure 2:
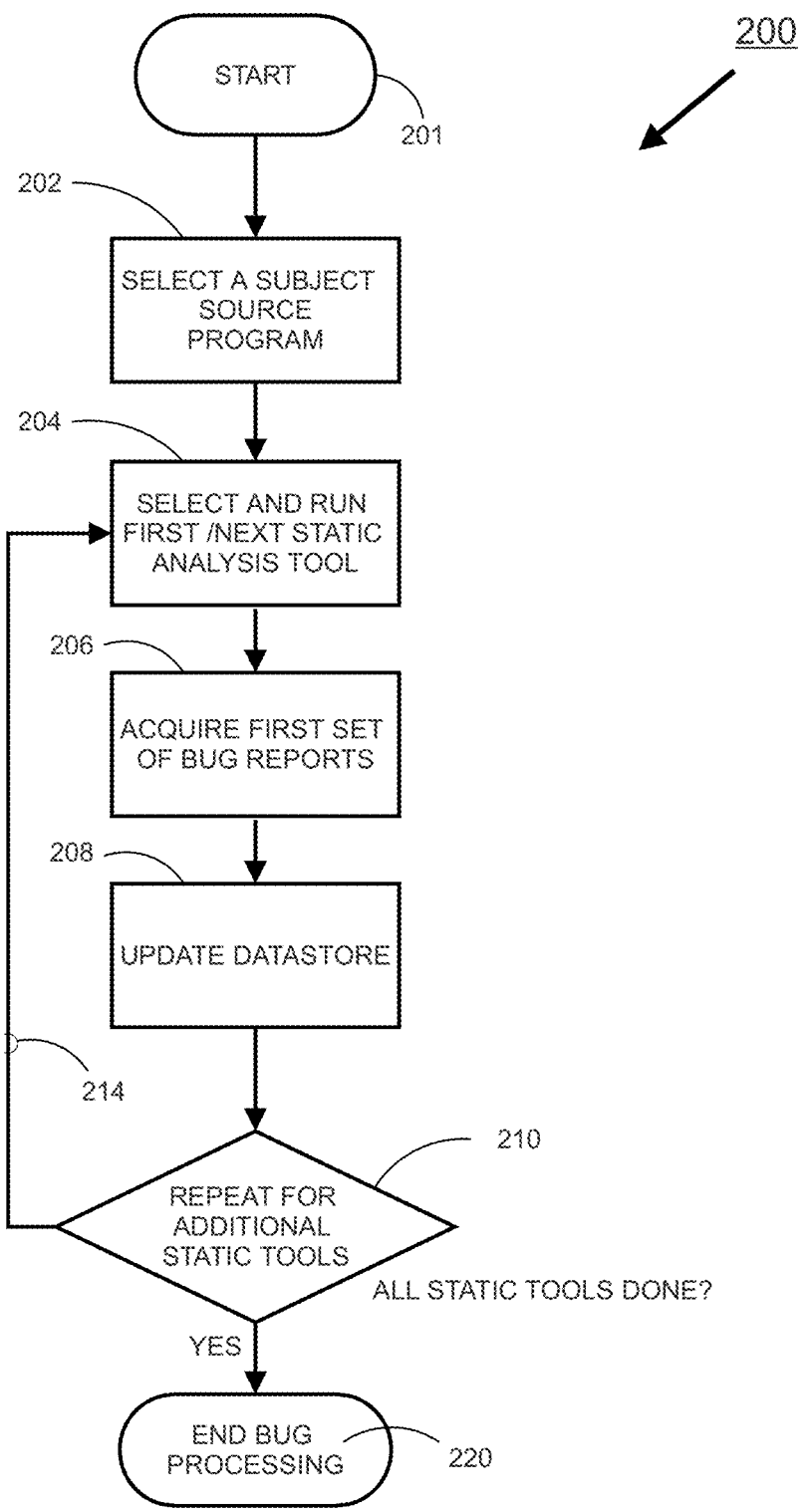
FIG. 2 is a simplified flow diagram illustrating a process for building a dataset of bug reports for a source code program.

As noted, one application of the present disclosure is to apply Machine Learning (ML) techniques to better separate true positives from false positives. First, we assemble a dataset of static tool bug reports. FIG. 2 shows a simplified flow diagram 200 illustrating a process for building a dataset of bug reports for a source code program. In the figure, the process begins at terminal block 201, and then selects a subject source code file, block 202. The file may be stored in a repository as illustrated in FIG. 1A. Next the process selects and executes a first static tool on the selected file, block 204. The first static tool generates a first set of bug reports, block 206. These reports are used to update a datastore, block 208, to aggregate reports on the source file. Then the process repeats for additional static tools, via loop path 214. The number of tools used is not critical, three to five would be effective for most applications. The aggregated dataset may comprise, for example, a few hundred bug reports. In one example, it may comprise reports from two or three static tools, applied over perhaps four or five code projects. These numbers are not critical, merely illustrative.

Additional training with more data can be used later if deemed necessary or desirable to improve the prediction model performance. Decision 210 determines if all the static tools have completed, and if so the process terminates at 220.

Figure 3:
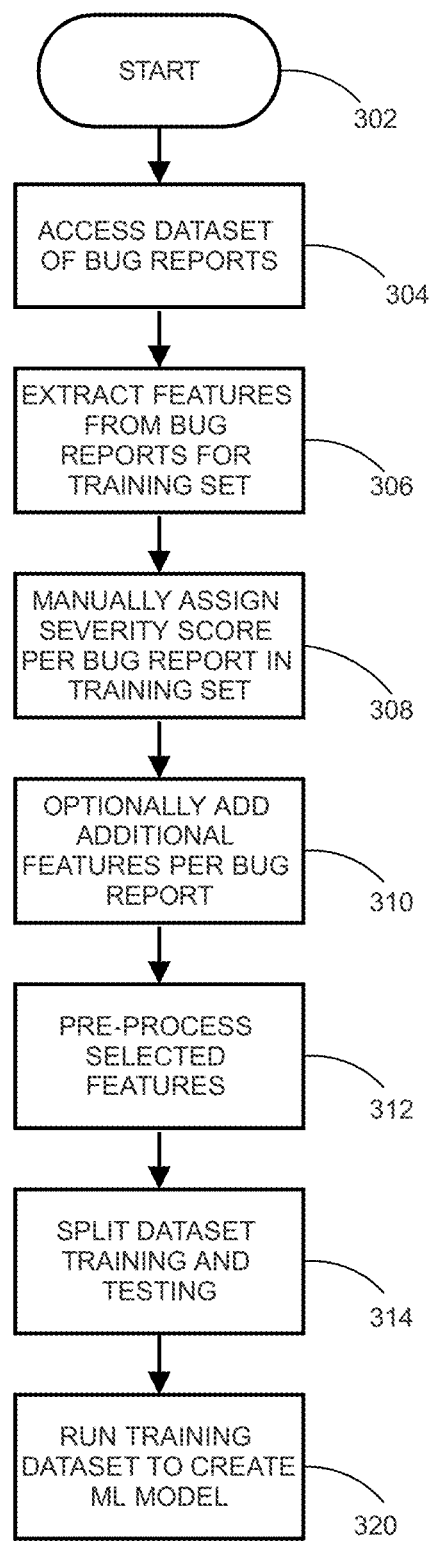
FIG. 3 is a simplified flow diagram illustrating a process for creating a training dataset to train a machine learning model to generate predictions based on an input dataset of bug reports.

To build a predictive Machine Learning model, we need to first train the model with a supervised dataset. We begin with the raw aggregated bug report dataset, and then augment it as follows to create the training dataset. FIG. 3 is a simplified flow diagram illustrating a process for creating a training dataset to train a machine learning algorithm to generate predictions based on an input dataset of bug reports. The process of FIG. 3 begins at 302 and accesses a dataset of bug reports, block 304. Preferably, bug reports for multiple projects are accessed to create a sizeable dataset. The bug reports preferably are aggregated from multiple static tools. Bug reports may be aggregated by a process such as that illustrated in FIG. 2, described above.

In one example, a user may manually triage several open source projects, and tag the bug reports with a "severity score" that expresses how likely the bug is to be a true positive in the judgment of the reviewer. The severity score is a feature added to each bug report in the dataset, with its value inserted manually. See Block 308 in FIG. 3. The score can be quantified in various ways. In one embodiment, the severity score may be quantized on a scale with increments of 0.2 to cover the range from 0 to 1. Any convenient scale and number of quanta may be used. In the simplest case, a binary value probably lacks sufficient resolution for the ML model to work well. In the present example, interpretations of various severity tags (scores) are shown below:

| Severity Score | Description |
| --- | --- |
| 0 | False Positive |
| 0.2 | Most Likely a False Positive |
| 0.4 | Probably a False positive |
| 0.6 | Probably a True positive |
| 0.8 | Most Likely a True Positive |
| 1.0 | True Positive |

Next, to build the training set, we extract a set of features from the bug reports. An example set of features was listed above. These may be used to build a dataset:
tnTool—Tool type or name
tnType—Error type
tnDesc—Error Description
tnFile—File path at which tool reports a bug
tnLine—Line number on which tool reports a bug
tnProcedure—Method name in which tool reports a bug
error_num—Index number of the reported bug.
Additional Dataset Features In a presently preferred embodiment, in addition to the above features, additional or "enhanced" features including one or more of the following may be added. See block 310 in FIG. 3. Explanation follows each feature name. In an embodiment, the steps explained below to implement these additional or supplemental features may be carried out by software components stored at 140 (FIG. 1B).
    1 test_in_file_nm—
For each bug report, extract filename from the field tnFile. Assign a value of 1 to test_in_file_nm if there is test or mock in the file name, else 0.
    2 match_line_num—
For each bug report, determine whether its line number (field tnLine) is listed by another static tool as well. For example, if Infer suggests a bug in line number 'x' for a project 'A', see if Error Prone also suggests a bug in line number 'x' for project 'A'. Assign a value of 1 to indicate one or more matches, else 0.

3. num_errs_in_file—
For each bug report, calculate how many errors are reported in the file in which the bug has been reported.
    4. close_or_flush_in_file—
This feature is introduced to handle errors of type RESOURCE_LEAK. If an object is opened and not closed, Infer, for example, generates a resource leak report for that method. Sometimes, Infer (or other tools) may fail to identify a close statement for an object. For bug reports with a resource leak bug type, whether there is a close or flush in the reported file. Assign a 1 to this feature if a close/flush statement is present, else 0. For all bug reports with bug types other than RESOURCE_LEAK, this feature will have a value 0.
    5. race_type—
This feature corresponds to the bug type THREAD_SAFETY_VIOLATION. This feature is extracted from the feature tnDesc. For all the reports with bug type THREAD_SAFETY_VIOLATION, if the concurrency is due to read/write race, we assign 0 and if it is due to write/write condition we assign 1. For the bug reports with bug types other than THREAD_SAFETY_VIOLATION, we assign a value of 2. One example of another type of race is a "write/write" race.
    6. variable_count—
This feature corresponds to the bug type THREAD_SAFETY_VIOLATION. For each bug report with bug type THREAD_SAFETY_VIOLATION, from the error description, we extract the method/methods that cause concurrency violation. Feature variable_count stores the count of number of times a method violates concurrency in a particular file.
    7. nullable_in_file—
This feature corresponds to the bug type NULL_DEREFERENCE. In one embodiment, we look for presence of @nullable annotation within plus or minus 20 lines of the location of the bug. If yes, we assign it a value of 1, else 0. For all the other types of bug reports (tnType), we assign a value of 0. The range plus or minus 20 lines of code is not critical; other ranges in that order of magnitude may be used. A useful range may vary with the code language and other factors.

Importantly, the specific feature values described above (0, 1, 2 . . . ) are arbitrary; they might just as well be letters or other symbols. The key is to convey this information into the training dataset in a consistent manner across bug reports, for processing in the context of the rest of the features. This work may be implemented, for example, in a model building software component 144 (FIG. 1B), executable by the server.

Other selected or enhanced features that may be captured and added to a bug dataset include any or all of i) whether a bug was fixed, ii) how long the bug took to fix, iii) how the bug was fixed (for example, as part of the same code change that introduced the bug or via a separate code change or via some other well-defined mechanism). With these features, the model may be trained to predict any or all of i) whether a bug is likely to be fixed, ii) how long a bug is likely to take to fix, iii) via what mechanism a bug is likely to be fixed.
Pre-Processing In a preferred embodiment, pre-processing at least some of the bug data improves performance of the prediction model. Two examples are binning and "One-Hot Encoding." Data Binning is a known way to group a number of more or less continuous values of a variable into a smaller number of bins. In one embodiment, we perform binning for certain features as follows:
    num_errs_in_file—Once the process determines a count of number of errors in a file for each bug report, we pick the maximum and minimum of the error counts in our dataset.

We divide the (maximum-minimum) of the error counts column into 5 ranges. We map the num_errs_in_file attribute of each bug report with its corresponding bin value.

variable_count—Similar to the attribute num_errs_in_file, we split the (maximum–minimum) of variable counts into 5 bins and map the variable_count attribute of each bug report to its corresponding bin value.

The number of bins used in these processes (for example, 5) is not critical; other values may be useful. Ideal values may be estimated empirically, for example, by varying the binning, re-training the model, and then applying the revised model to the previous test dataset for comparison.

One hot encoding generally is used for converting categorical data to numerical data. It transforms a single variable with n observations and d distinct values, to d binary variables with n observations each. Each observation then indicates the presence (1) or absence (0) of the dth binary variable. For instance, [house, car, tooth, car] becomes [[1,0,0], [0,1,0], [0,0,1], [0,1,0]]. One hot encoding may be required for some ML algorithms. In one embodiment, the following features are one hot encoded, and incorporated in to the ML dataset in that encoded form:

1. test_in_file_nm
2. match_line_num
3. num_errs_in_file
4. close_or_flush_in_file
5. race_type
6. variable_count
7. tnType
8. tnTool After the dataset is assembled, to include the basic and additional or enhanced features for each bug report, and pre-processing completed, the completed dataset can be split into two parts—one part for training and the other part for testing the model. For example, an 80/20 split is common but this is not critical. The data should be split up at random. The training set is then provided to train a selected ML model. Several such models are known and available. Examples that are useful for present purposes include but are not limited to: Naïve Bayes, Random Forest and Support Vector Machine.

Once a model is selected and trained, one can measure the prediction accuracy of each model by enumerating the bug reports in testing data that the model has classified correctly. Since models predict the severity score, which is a real number between 0 and 1, there are multiple ways one can define accuracy. For example, absolute accuracy may be defined as the model predicting a severity score for a bug that equals the value manually assigned to the bug. This can be used to compare accuracy among algorithms.

Another method is to discretize the model prediction into two buckets: first bucket for severity scores less than 0.5, and the second bucket with scores of 0.5 or more. One can say the model made a "correct prediction" if the predicted severity and the actual severity fall in the same bucket. Another variation may define "correctness" as a predicted value falling within a selected tolerance of the assigned value.

One consideration to improve performance is to utilize additional or different static tools in the process. The chosen model(s) can be retrained, and again performance in terms of accuracy compared to earlier test datasets. Different tools may provide reports of different bug types; they may generate different features in bug reports. The disclosure above can be applied by those stilled in the art to apply it to leveraging other static tools, and to predicting additional features beyond the likelihood of a false positive (severity score). For example, security impact could be assessed by training on labeling provided by security experts, or the likelihood that a developer will quickly fix an issue could be predicted based on observations of developer bug fixes. Further, additional embodiments can be developed by applying the foregoing teaching to the selection of bug report features to include in building a dataset, and the development of additional or enhanced features derived from those basic features to add to that basic dataset. All such variations fall within the scope of this disclosure.

Implementation Hardware and Software

Most of the equipment discussed above comprises hardware and associated software. For example, the typical electronic device is likely to include one or more processors and software executable on those processors to carry out the operations described. We use the term software herein in its commonly understood sense to refer to programs or routines (subroutines, objects, plug-ins, etc.), as well as data, usable by a machine or processor. As is well known, computer programs generally comprise instructions that are stored in machine-readable or computer-readable storage media. Some embodiments of the present invention may include executable programs or instructions that are stored in machine-readable or computer-readable storage media, such as a digital memory. We do not imply that a "computer" in the conventional sense is required in any particular embodiment. For example, various processors, embedded or otherwise, may be used in equipment such as the components described herein.

Memory for storing software again is well known. In some embodiments, memory associated with a given processor may be stored in the same physical device as the processor ("on-board" memory); for example, RAM or FLASH memory disposed within an integrated circuit microprocessor or the like. In other examples, the memory comprises an independent device, such as an external disk drive, storage array, or portable FLASH key fob. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such as a conventional rotating disk drive. All such memories are "machine readable" or "computer-readable" and may be used to store executable instructions for implementing the functions described herein.

A "software product" refers to a memory device in which a series of executable instructions are stored in a machine-readable form so that a suitable machine or processor, with appropriate access to the software product, can execute the instructions to carry out a process implemented by the instructions. Software products are sometimes used to distribute software. Any type of machine-readable memory, including without limitation those summarized above, may be used to make a software product. That said, it is also known that software can be distributed via electronic transmission ("download"), in which case there typically will be a corresponding software product at the transmitting end of the transmission, or the receiving end, or both.

Having described and illustrated the principles of the invention in a preferred embodiment thereof, it should be apparent that the invention may be modified in arrangement and detail without departing from such principles. We claim all modifications and variations coming within the spirit and scope of the following claims.

The invention claimed is:

1. A method comprising:
   accessing a source code file stored in a non-volatile memory;
   executing a static analysis tool to generate bug reports on the source code file, wherein each bug report includes a set of bug features, and wherein the bug reports and bug features are generated by the static analysis tool to create generated bug reports;
   storing the generated bug reports to form a machine-readable bug dataset;
   selecting a bug feature that is not natively generated by the static analysis tool to create a selected bug feature;
   accessing a machine learning (ML) classifier that has been trained to predict the selected bug feature;
   executing the ML classifier on the bug dataset to generate an estimated value of the selected bug feature for at least some of the bug features in the bug dataset, the estimated value based at least in part on the selected bug feature being found in one or more of the generated bug reports; and
   updating the bug dataset to include the estimated value of the selected bug feature for the bug reports for which a value was generated by the ML classifier to improve accuracy of the static analysis tool.

2. The method of claim 1 and further comprising:
   assessing a quality of the source code file based on the estimated values of the selected bug feature over the updated bug dataset; and
   returning a report of the quality assessment.

3. The method of claim 2 wherein the selected bug feature is a "severity score" that expresses a likelihood that the corresponding bug report is a true positive.

4. The method of claim 3 including ranking the bug reports in the bug dataset based on the corresponding severity scores.

5. The method of claim 3 further comprising:
   identifying, based on the severity scores, which bugs are likely to be true positive and including, in the report, an identifier of the bug reports determined as likely to be true positive.

6. The method of claim 1 including training the ML classifier by:
   accessing the bug dataset, and extracting at least some of the set of bug features of each bug report to form a second dataset;
   for each bug report in the second dataset, generating a value for at least one enhanced feature, wherein the at least one enhanced feature value is derived from the bug dataset;
   adding the enhanced feature values to the second dataset;
   adding a field to the second dataset for the selected bug feature;
   manually assigning values to the selected bug feature for at least some of the bugs in the second dataset;
   dividing the second dataset into a training dataset and a testing dataset;
   inputting the training dataset to train the ML classifier to predict a value of the selected bug feature for an input bug report.

7. The method of claim 6 wherein the value for the selected bug feature is automatically or manually inferred by examining developer activity and computing a function of that activity.

8. The method of claim 7 wherein the selected bug feature specifically captures any or all of i) whether a bug was fixed, ii) how long the bug took to fix, iii) how the bug was fixed (e.g. as part of the same code change that introduced the bug or via a separate code change or via some other well-defined mechanism); and
   training the ML classifier to predict at least one of i) whether a bug is likely to be fixed, ii) how long a bug is likely to take to fix, iii) via what mechanism a bug is likely to be fixed.

9. The method of claim 8 wherein the bug value of the selected bug feature is inferred by examining bug fix activity by analyzing the corresponding pulls requests and commits/file change history.

10. The method of claim 6 wherein in the native bug report features extracted to form the second dataset include at least some of the following fields:
    tnTool—Tool type or name;
    tnType—Error type;
    tnDesc—Error Description;
    tnFile—File path at which tool reports a bug;
    tnLine—Line number on which tool reports a bug;
    tnProcedure—Method name in which tool reports a bug;
    error_num—Index number of the reported bug.

11. The method of claim 6 wherein the enhanced features include at least one feature based on the filename of the source code file being analyzed.

12. The method of claim 6 wherein the enhanced features include:
    a binary value indicating existence vel non of a test or mock term in the filename;
    a binary value indicating existence vel non of a bug line number that is also suggested by at least one other static analysis tool; and
    an integer number of errors reported in the file in which the bug has been reported.

13. The method of claim 6 wherein the second dataset features include, for a bug report with a resource leak bug type, a binary value indicating whether a close/flush statement is present in the reported file.

14. The method of claim 6 wherein the second dataset features include, for a bug report with a bug type THREAD_SAFETY_VIOLATION, a variable indicating a race type.

15. The method of claim 6 and further comprising:
    for a bug report with a bug type THREAD_SAFETY_VIOLATION, extracting from the error description an identifier of a method that caused concurrency violation, and then adding to the set of features in the second dataset a variable_count feature that stores a count of a number of times the method violates safe concurrency in the file.

16. The method of claim 6 and further comprising:
    for a bug report with a bug type NULL_DEREFERENCE, determining whether an @nullable annotation appears within a selected range of the location of the reported bug; and
    adding to the set of features in the second dataset a binary indication of whether an @nullable annotation appears within the selected range.

17. The method of claim 16 wherein the selected range is within approximately plus or minus 20 lines of the location of the bug.

18. The method of claim 6 wherein the ML classification model is selected from a set of models that includes at least one of Naive Bayes, Random Forest, and Support Vector Machine models.

19. The method of claim 6 wherein the enhanced features include an integer number of errors reported in the source code file (num_errs_in_file); and further comprising:
   determining a maximum and a minimum of the error counts in the second dataset; dividing a value equal to (maximum-minimum) of the error counts feature into a plurality of numbered bins, each bin defined by a corresponding range of error counts; and
   mapping the [num_errs_in_file] attribute of each bug report with its corresponding bin number.

20. The method of claim 6 wherein the enhanced features include an integer number of variables in the source code file (variable_count), and further comprising:
   dividing a value equal to (maximum-minimum) of the variable counts into a plurality of bins and mapping the variable_count attribute of each bug report to its corresponding bin number.

21. The method of claim 6 including one hot encoding at least one of the following set of features and incorporating the hot-encoded feature(s) into the ML dataset in encoded form:
   test_in_file_nm;
   match_line_num;
   num_errs_in_file;
   close_or_flush_in_file;
   race_type;
   variable_count;
   tnType;
   tnTool.

22. A method comprising:
   accessing a machine-readable bug dataset of bug reports generated by at least one static analysis tool for a source code file, wherein each bug report includes a set of bug features and wherein the bug reports and bug features are generated by the static analysis tool;
   selecting a bug feature that is not natively generated by the static analysis tool to create a selected bug feature;
   accessing an ML classifier that has been trained to predict the selected bug feature;
   executing the ML classifier on the bug dataset to generate an estimated value of the selected bug feature for at least some of the bug features in the bug dataset, the estimated value based at least in part on the selected bug feature being found in one or more of the bug reports; and
   updating the bug dataset to include the estimated value of the selected bug feature for the bug reports for which a value was generated by the ML classifier to improve accuracy of the static analysis tool.

23. The method of claim 22 wherein the selected bug feature is a "severity score" that expresses a likelihood that the corresponding bug report is a true positive, and further comprising:
   executing the ML classifier on the bug dataset to predict a severity score for at least some of the bugs in the bug dataset; and
   updating the bug dataset to include the predicted severity score for the bug reports for which a value was generated by the ML classifier.

24. The method of claim 23 including assessing a quality of the source code file based on the estimated values of the severity scores over the updated bug dataset and returning a report of the quality assessment.

25. The method of claim 22 wherein the selected bug feature expresses a likelihood that the corresponding bug will be fixed by developers if reported.

26. The method of claim 22 wherein the selected bug feature expresses the expected "time to fix" for the reported bug.

27. The method of claim 22 wherein the selected bug feature expresses whether the bug is likely to be fixed as part of the code change set (e.g., pull request/merge request) it is reported against vs. fixed in a separate code change set.

* * * * *